(12) United States Patent
Brown

(10) Patent No.: US 6,228,300 B1
(45) Date of Patent: May 8, 2001

(54) MOLDABLE FOOTWEAR

(76) Inventor: Roy L. Brown, Rte. 3 Box 399, Nevada, MO (US) 64772

( * ) Notice: Subject to any disclaimer, the term of this patent is extended or adjusted under 35 U.S.C. 154(b) by 0 days.

(21) Appl. No.: 09/320,967

(22) Filed: May 27, 1999

(51) Int. Cl.[7] .................................................. B29C 67/00
(52) U.S. Cl. .............................. 264/134; 264/322; 425/2; 8/150; 69/21; 427/412
(58) Field of Search ..................................... 264/134, 292, 264/313, 299, 319, 223, 322, DIG. 30; 425/2; 8/150, 150.5; 69/21; 427/412; 428/540; 106/124.4

(56) References Cited

U.S. PATENT DOCUMENTS

| | | | | |
|---|---|---|---|---|
| 1,274,837 | * | 8/1918 | Aschiem | 69/21 |
| 2,285,064 | * | 6/1942 | Straw | 264/222 |
| 2,285,376 | * | 6/1942 | Lovell | 264/222 |
| 2,294,474 | * | 9/1942 | Marx | 69/21 |
| 3,358,332 | * | 12/1967 | Downey | 18/19 |

* cited by examiner

Primary Examiner—Jan H. Silbaugh
Assistant Examiner—Edmund H. Lee
(74) Attorney, Agent, or Firm—Hovey, Williams, Timmons & Collins

(57) ABSTRACT

Moldable products which conform to the size and shape of a particular object and methods of forming the same are provided. The products are made from a material selected from the group consisting of natural leathers, synthetic leathers, and mixtures thereof. The products and methods of the invention are particularly useful for manufacturing custom-fit footwear at a reasonable price. Methods in accordance with the invention comprise molding the starting material on and around a foot, wetting the material with a mixture comprising a leather stiffening or hardening agent, and drying the wetted material while still on the foot.

14 Claims, 1 Drawing Sheet

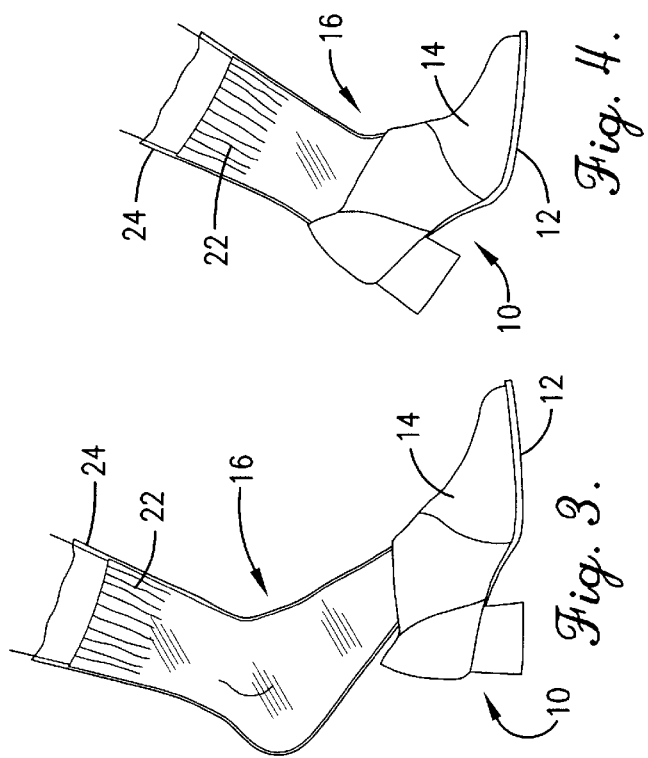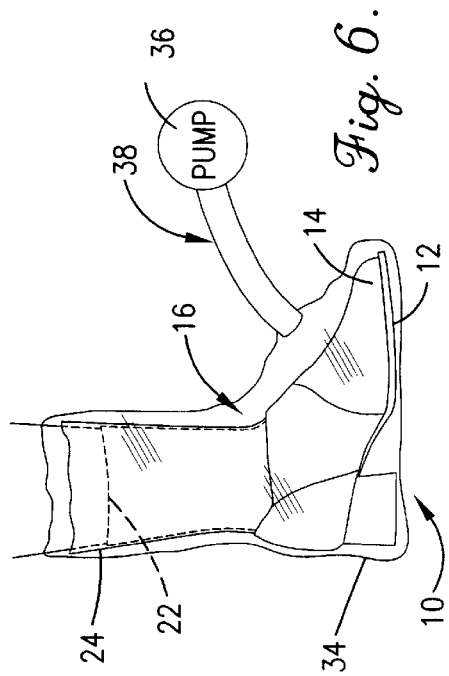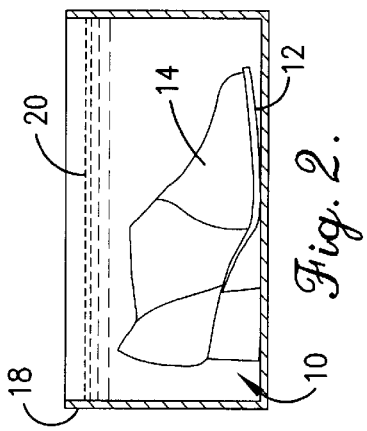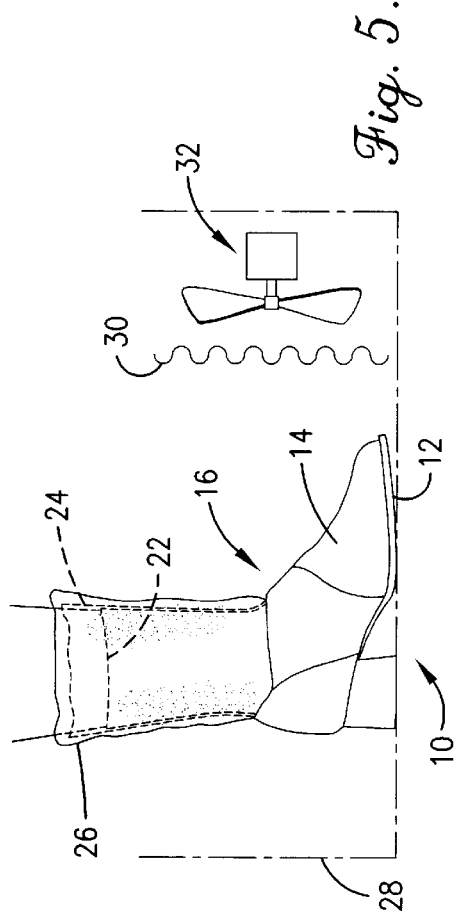

MOLDABLE FOOTWEAR

BACKGROUND OF THE INVENTION

1. Field of the Invention

The instant invention is broadly concerned with products molded to conform to the size and shape of a particular object and methods for producing these products. In preferred forms, the products of the invention are footwear products (such as shoes or boots) having substantially the same size and shape of the foot on which it is to be worn. Products of the invention are formed from moldable materials which stretch and shape easily, such as natural leathers, synthetic leathers, and mixtures thereof. In the methods of the invention, the moldable material is cut to a size and shape similar to that of the object around which it is to be molded. A mixture comprising a leather hardening or stiffening agent is then applied to the material. The resulting mixture-covered material is dried while remaining on the object, resulting in a form-fitting, molded product at a cost much lower than the cost of currently available custom-made products.

2. Description of the Prior Art

Animal hides or skins are preserved by a process called tanning wherein a chemical is applied to the hide or skin. This process makes the hide immune to bacterial attack, raises the shrinkage temperature of the hide, and prevents the collagen fibers from sticking together upon drying, resulting in a material that remains porous, soft, and flexible. Two widely used tanning methods include vegetable tanning and chrome tanning. With chrome tanning, the pickled hide is usually saturated with a solution of basic chrome sulfate, followed by precipitation of the chrome compound by adding a small quantity of a mild alkali. This results in a reaction of a coordination nature between the carboxyl groups of the skin collagen and the metal atoms. With vegetable tanning, heavy hides are given a series of baths in gradually increasing strengths of extracts containing tannic acid (tannins), such as quebrachro and wattle extracts. Molecular aggregates of the tannin within the hides form cross-links between the polypeptide chains of the hide proteins. Vegetable tanning produces a relatively dense leather that is pale brown in color and tends to darken upon exposure to natural light.

In the past, vegetable-tanned leather has rarely been used in footwear because it absorbs water and leather conditioner quickly, and it stretches and shapes too easily. Thus, prior art vegetable-tanned leather shoes would quickly stretch so that eventually they no longer fit the wearer's feet. This is particularly true when the vegetable-tanned leather is exposed to moisture.

Shoes, boots and other footwear have generally been made from chrome-tanned leather. While chrome-tanned leather doesn't absorb water or leather conditioners easily, it also doesn't shape easily. In the past however, chrome tanning has been the quickest and easiest way to tan leather. In the manufacturing process, shoes are built on lasts of varying sizes categorized by widths and lengths. The chrome-tanned leather is shaped over the last with heat and pressure, resulting in a shoe having a well-retained shape with little stretch remaining in the leather. If the shoe is too tight, the wearer oftentimes wears the shoe for a number of days or weeks in hopes of stretching the leather until a comfortable fit is obtained. This can be painful for the wearer as well as harmful to the wearer's feet. However, this method of manufacturing shoes is much more affordable than having shoes custom-made (which is very labor intensive) to the exact size and shape of the wearer's foot.

SUMMARY OF THE INVENTION

The instant invention overcomes the above problems by providing products (preferably leatherwear, and more particularly footwear) and methods of making leatherwear and footwear from vegetable-tanned leather or any other tanned leather (either natural or synthetic) having properties similar to vegetable-tanned leather. The methods of the invention result in footwear which is moldable to the wearer's foot, and which retains the shape of the foot even if subjected to repeated stress or exposed to water and other lubricants.

In more detail, the products and methods of the invention involve wetting a leather or leather-like material with a hardening mixture and molding the wet material into the shape of a particular object, such as a foot or some other body part. The wet material is placed on and/or around the object and dried so that the material stiffens into, and retains the shape of the object. The material to be molded is selected from the group consisting of natural leathers, synthetic leathers (as used hereinafter "synthetic leathers" refers to materials comprising a sheet of resin adhered to a piece of cloth or fabric, as well as to any other material designed to look similar to or have properties similar to those of natural leather), and mixtures thereof. Natural leathers are the preferred material, with vegetable-tanned leather or leather which contains tannin cross-linked polypeptide chains being particularly preferred.

The methods of the invention are particularly useful for forming footwear (as used hereinafter "footwear" refers to any item which can be worn on the feet, including boots, ladies' dress pumps, loafers, etc.) which molds to substantially the same size and shape of the foot around which it is dried. While the wet material can be dried simply by maintaining the material on the object (i.e., foot) until the material dries, the preferred drying process comprises subjecting the wet material (while it is molded around the particular object such as a foot) to circulating hot air having a temperature of from about 150–250° F., and more preferably from about 200–225° F. Preferably, the drying step is carried out for a time period of from about 10–30 minutes, and more preferably from about 15–20 minutes. After drying, shoes and other products in accordance with the invention will fit the individual shape of the foot or other object and will retain that shape through repeated stress and exposure to water. The final dried product should have a tensile strength (as determined by ASTM D2209-90) of at least about 1100 psi, preferably at least about 1750 psi, and more preferably at least about 2200 psi. Furthermore, the final product has a breakforce (as determined by ASTM D2209-90) of at least about 35 lbs, preferably at least about 65 lbs, and more preferably at least about 95 lbs. Finally, the final product should have a moisture absorption (as determined by ASTM D 1815-96) of at least about 62%, preferably at least about 74%, and more preferably at least about 75–86%.

The hardening mixture utilized in the instant invention comprises a leather stiffening or hardening agent and water. The hardening mixture can also include a leather conditioning agent if desired. The preferred hardening mixture will contain from about 10–40% by volume, and preferably from about 15–30% by volume, based upon the total volume of the mixture being taken as 100% by volume. Preferred leather stiffening or hardening agent are water-based acrylics.

BRIEF DESCRIPTION OF THE DRAWINGS

FIG. 1 is a schematic illustration showing the size of a starting shoe relative to a foot to which the shoe is to be molded;

FIG. 2 illustrates the application of the leather stiffening mixture to the shoe;

FIG. 3 illustrates the foot wearing a sock and protective bag as it is inserted into the shoe;

FIG. 4 is a schematic illustration of the foot from FIG. 3 fully inserted into the shoe;

FIG. 5 is a schematic illustration depicting the shoe and foot from FIG. 4 in the heating/drying apparatus; and FIG. 6 illustrates the shoe and foot from FIG. 4 in the compressing apparatus.

DETAILED DESCRIPTION OF THE PREFERRED EMBODIMENTS

Referring to FIG. 1, a shoe 10 is comprised of a sole 12 and an upper 14. The shoe 10 is preferably of a size that is substantially the same size as foot 16, and more preferably shoe 10 is from about ½ to 1 size smaller than foot 16. Furthermore, the outlines, sizes, and shapes of sole 12 and upper 14 should be similar to that of foot 16. The upper 14 may be made of genuine or natural leathers, synthetic leathers, or mixtures thereof.

As illustrated in FIG. 2 the upper 14 is initially saturated by placing the shoe 10 in a container 18 filled with a mixture 20 comprising water and a leather hardener or stiffener. While the illustrated container 18 includes mixture 20 filled within the container at a level above the shoe 10, it may be desirable to place a smaller amount of mixture 20 in the container 18 so that the mixture 20 does not flow into the shoe 10. Preferably, the mixture comprises from about 60–90% by volume water and from about 10–40% by volume leather hardener or stiffener, with the volume of the total mixture being taken as 100% by volume. More preferably, the mixture comprises from about 70–80% by volume water and from about 15–30% by volume leather hardener or stiffener, and most preferably about 75% water and about 25% hardener or stiffener. While any leather hardeners or stiffeners used in the art are suitable for use in the methods and products of the invention, preferred leather hardeners or stiffeners are water-based acrylics such as MSS-5000 (available from Imperial Adhesives Inc., Cincinnati, Ohio). If desired, a leather conditioner can be utilized in the mixture 20. In instances where a leather conditioner is used, it should be present at a level of from about 4–6% by volume, with the volume of the total mixture being taken as 100% by volume. A preferred leather conditioner is CP 1700 (available from Imperial Adhesives, Inc.).

A sock 22 is then placed on foot 16 (FIG. 3). In order to ensure a more comfortable fit, it is preferred that the sock 22 be of the same general thickness as the sock that the wearer will usually wear with shoe 10 in its molded, finished form. A plastic bag 24 is then placed over the foot 16 (in order to protect the skin from the chemicals in mixture 20), and the foot 16 is then inserted into shoe 10. The shoe 10, which has previously been saturated with mixture 20, should slip easily onto foot 16 even though shoe 10 is smaller than foot 16 (FIG. 3 and FIG. 4). The wearer should then walk around for a period of time sufficient to allow the wet upper 14 to dry on the foot 16 of the wearer. Preferably, the drying process is quickened by the use of heat and/or circulating air. More preferably and referring to FIG. 5, the wearer places an insulated reflective wrap 26 over his/her exposed ankle or leg. Foot 16 is then placed into a box 28 heated by electric element 30, with fan 32 circulating the heated air around and across upper 14. The heat assists in setting the hardener or stiffener in the leather while the air flow generated by fan 32 decreases the drying time of the leather. Preferably, the air within box 28 is heated to a temperature of from about 150–250° F., and more preferably from about 200–225° F. It is preferred that foot 16 (wearing upper 14) be subjected to heated air flow for a time period of from about 10–30 minutes, and preferably for about 15 minutes. Upon emerging from box 28, the upper 14 of shoe 10 will have formed to the shape of foot 16 while standing and walking. The shape of the shoe will be substantially retained as a result of the chemical and heat treatments. Furthermore, the finished shoe will accept leather conditioners well.

If the shoe 10 becomes too loose or if the wearer desires a tighter fit (either after the shoe 10 has been saturated with the mixture 20 as shown in FIG. 2, or after the finished shoe 10 has been worn for some time), then the shoe 10 can be adjusted by the user. Particularly, the upper 14 of shoe 10 is saturated by mixture 20, and the saturated shoe is slipped into a vacuum bag 34 having a pump 36 connected to it via hose 38 (FIG. 6). The pump 36 is then used to compress the leather of upper 14 to foot 16 by subjecting upper 14 to a pressure of from about 8–15 psi, and more preferably from about 9–12 psi. Heat treatment is then carried out on shoe 10 as described above and as illustrated in FIG. 5.

While a shoe is used for purposes of illustration in FIGS. 1–6, the instant invention is not limited to shoes, but instead may be applied to all types of footwear, including boots, as well as other leatherwear such as gloves. In another embodiment, a leather shoe liner can be incorporated into the interior of shoes formed according to the invention. The liner would be formed in the same manner as described above with respect to the shoes, however the liner would preferably have a thickness that is less than the thickness of the shoe itself The liner would have the same moisture absorption properties set forth previously and would thus be useful for absorbing perspiration. Also, the shoes can be waterproofed with any conventional leather waterproofing composition in applications where this is desirable. However, waterproofing of the shoe will generally not be necessary as the hardening mixture holds the pores of the leather open so that the leather can accept more conditioner. Furthermore, the hardening mixture seals the stitched seams and welting creases so that little or no seepage is experienced after extended and repeated contact with mud and water.

Those skilled in the art will appreciate that footwear made in accordance with the methods of the invention has a superior fit compared with currently available custom-made footwear. This is extremely important for the comfort and health of the wearer's feet. Also, if desired, a malleable arch support can be incorporated into shoe 10 for additional comfort and support. Furthermore, because standard manufacturing methods utilized in the shoe industry are applicable for obtaining the general shape and size of starting shoe 10, the price of manufacturing a shoe according to the instant invention will be reasonable and far below the price of custom or hand-made shoes.

Leather samples that were approximately 3½ inches by 4 inches (W×L) and 0.70 inches thick were treated with hardening mixtures comprising varying concentrations of MSS-5000. The samples were allowed to harden and were then tested for moisture absorption by following ASTM D1815-96. These results are reported in Table 1. The moisture absorption of untreated samples of skirting leather (having the same dimensions as above) was also determined for comparison to the instant product. The moisture absorption of the untreated samples was 54.63% after one hour and 54.62% after 3 hours. Clearly, treating the leather according to the invention significantly increased the moisture-absorbing capabilities of the leather.

TABLE 1

Moisture Absorption

| LEATHER PIECE[a] | MSS-5000[b] | Run 1 | Run 2 |
|---|---|---|---|
| Neck | 20% | 76.99% | 66.67% |
| Belly | 20% | 81.06% | 73.13% |
| Butt | 20% | 75.41% | 74.42% |
| Shoulder | 20% | 42.62% | |
| | | | |
| Neck | 35% | 75.32% | 69.67% |
| Shoulder | 35% | 68.53% | 64.29% |
| Belly | 35% | 82.83% | 70.99% |
| Butt | 35% | 70.10% | 77.02% |
| Shoulder | 2% | 62.69% | |
| | | | |
| Neck | 20% | 76.06% | |
| Shoulder | 20% | 76.08% | |
| Belly | 20% | 85.70% | |
| Butt | 20% | 76.35% | |

[a]Designates portion of cattle from which leather section was taken.
[b]Designates the percent by volume of leather hardener MSS-5000 in the hardener mixture.

The breakforce and tensile strength of treated leather samples was also determined. The procedures set forth in ASTM D2209-90 were followed. These results are set forth in Table 2.

TABLE 2

Breakforce and Tensile Strength

| Sample # | Description[a] | Thickness | Width | Breakforce (lbs) | Tensile Strength (psi) |
|---|---|---|---|---|---|
| 2 | 25% | 0.068 | 0.500 | 30.0 | 882.4 |
| 3 | 25% | 0.068 | 0.502 | 74.0 | 2167.8 |
| 4 | 25% | 0.064 | 0.490 | 36.9 | 1176.7 |
| 5 | 35% | 0.069 | 0.494 | 59.6 | 1748.5 |
| 6 | 25% | 0.075 | 0.493 | 92.6 | 2504.4 |
| 7 | 35% | 0.082 | 0.492 | 68.6 | 1700.4 |
| 8 | 50% | 0.090 | 0.494 | 62.0 | 1395.0 |
| 9 | 35% | 0.079 | 0.499 | 66.7 | 1692.0 |
| 10 | 50% | 0.080 | 0.499 | 89.5 | 2242.0 |
| 11 | 50% | 0.083 | 0.503 | 22.1 | 529.4 |

[a]Designates the percent by volume of leather hardener MSS-5000 in the hardener mixture.
[b]These samples were soaked in water after treatment to determine whether the hardener's effect would be diminished.

I claim:

1. A method of forming leatherwear substantially molded to a body part comprising the steps of:

applying a mixture to the surface of a starting material selected from the group consisting of natural leathers, synthetic leathers, and mixtures thereof to form mixture-covered material, said mixture comprising a water-based acrylic stiffening agent;

placing said mixture-covered material adjacent at least a portion of said body part to form a shaped material; and drying said shaped material by subjecting the shaped material to hot air while the shaped material remains adjacent said portion of said body part to at least partially stiffen said shaped material thereby forming said leatherwear, said leatherwear resulting from said drying step having an ASTM D2209-90 tensile strength of at least about 1100 psi.

2. The method of claim 1, wherein said body part is a foot.

3. The method of claim 1, wherein said starting material is a natural leather.

4. The method of claim 3, wherein said natural leather contains tannin cross-linked polypeptide chains.

5. The method of claim 3, wherein said leather is a vegetable-tanned leather.

6. The method of claim 1, wherein said drying step comprises subjecting said shaped material to hot air having a temperature of from about 150–250° F.

7. The method of claim 6, wherein said drying step is carried out for a time period of from about 10–30 minutes.

8. The method of claim 1, wherein said stiffening agent is present in said mixture at a level of from about 10–40% by volume, based on the total volume of the mixture being taken as 100% by volume.

9. The method of claim 1, said mixture further comprising a leather conditioner.

10. The method of claim 2, wherein said placing step further comprises forming said mixture-covered material into substantially the same shape as said foot.

11. The method of claim 10, wherein the product resulting from said drying step substantially retains said foot shape.

12. The method of claim 1, further including the step of compressing said shaped material resulting from said placing step prior to said drying step, said compressing step comprising applying a pressure of from about 8–15 psi to said shaped material.

13. The method of claim 1, wherein the product resulting from said drying step has an ASTM D1815-96 moisture absorption of at least about 62%.

14. The method of claim 1, wherein said placing step comprises placing inner and outer layers of said mixture-covered material adjacent at least a portion of said body part, said inner and outer layers having respective thicknesses and said inner layer being a liner and having a thickness that is less than said outer layer thickness.

* * * * *